Aug. 7, 1973   H. I. HAZZARD   3,751,549
PROCESS FOR IMPREGNATING ELECTRICAL COMPONENTS
Original Filed March 12, 1969
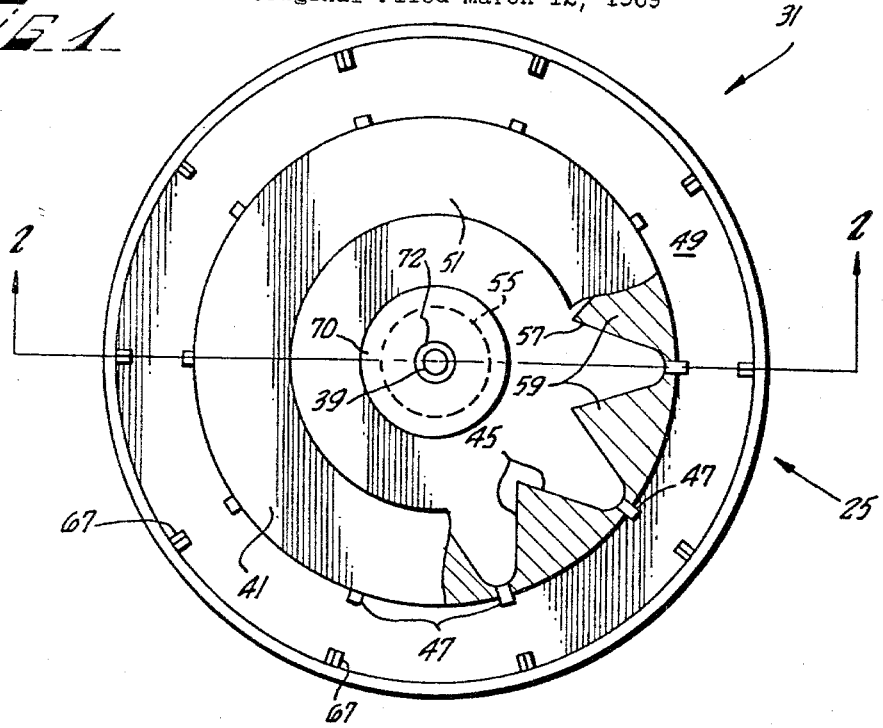
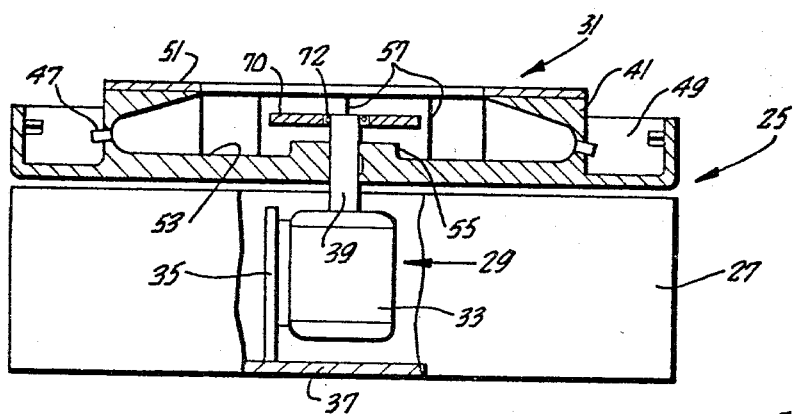
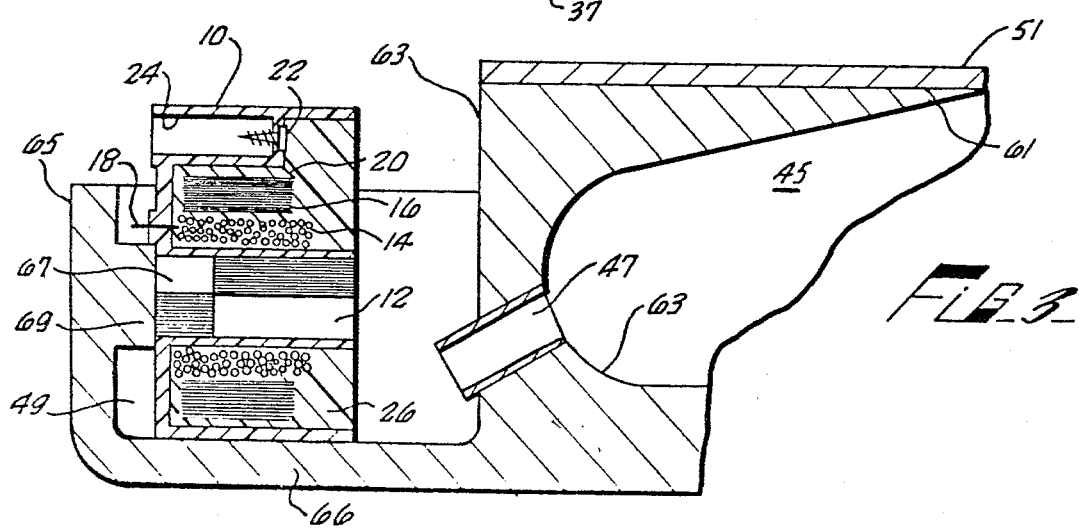

United States Patent Office

3,751,549
Patented Aug. 7, 1973

3,751,549
PROCESS FOR IMPREGNATING ELECTRICAL
COMPONENTS
Harry I. Hazzard, Los Angeles, Calif., assignor to
McCulloch Corporation, Los Angeles, Calif.
Original application Mar. 12, 1969, Ser. No. 806,520, now
Patent No. 3,619,865. Divided and this application
Sept. 7, 1971, Ser. No. 178,390
Int. Cl. B29c 5/04
U.S. Cl. 264—272
7 Claims

ABSTRACT OF THE DISCLOSURE

A motorized centrifugal impregnator insulates and mechanically pots coils and the like by centrifuging resin and catalyst into the interior of the coils' casings. The casings are mounted with their interiors to be filled facing radially inward on a circle about the rotational axis of the impregnator. An inner, generally flat surface of the impregnator is surrounded by equally spaced dividers which define distribution passages or channels leading to each coil casing. The passages are configured to produce radial resin and catalyst flow without resin pocketing. A lip or tube at the outer radial limits of each channel direct the resin into the coil casing. Resin and catalyst poured onto the inner surface are thoroughly mixed and distributed to the coils with the resin compound being equally divided by the equally spaced divider walls.

CROSS REFERENCE TO RELATED APPLICATIONS

This is a division of application Ser. No. 806,520 filed Mar. 12, 1969, now Pat. No. 3,619,865.

BACKGROUND OF THE INVENTION

The present invention relates to an apparatus and process for insulating and mechanically potting electrical components and, more particularly, an an apparatus and process in which electrical components, such as ignition coils, are impregnated and potted with thermosetting resin by centrifugal force.

U.S. Pat. 2,695,856 to Firth describes a process for impregnating and potting electrical components such as coils with a thermosetting resin by centrifugal force. The patentee employs a rotatable spinner plate which carries a plurality of coil hangers about its circumference. The coil hangers are pivotally mounted to the spinner plate to permit filling the casings of the coils with premixed thermosetting resin and catalyst before the spinner plate is rotated. After filling, the spinner plate is rotated at a rapid rate to cause the hangers to approach the rotational plane of the spinner plate. The resulting, centrifugally induced pressure on the thermosetting resin completely fills the interstices between coil windings and soaks into the coil windings. One of the results of the complete filling of the interstices is that the possiblity of dielectric failures, through air bubbles and the like, is dramatically reduced.

Notwithstanding the efficacy of the process described in the Firth patent, it does suffer some disadvantages.

One of these disadvantages is in the requirement for filling each casing while the spinner plate is stopped. The filling of the casings is a time consuming task because several of them must be filled for each impregnating operation and the filling must be reasonably full to ensure that all the voids and interstices within each casing are filled with resin during the centrifuging process. In addition, the resin and catalyst must be mixed together before being poured into the casings.

Another disadvantage of the Firth process results from the soaking up of considerable resin by the coil windings during spinning. Normally, in a finished coil only enough resin need be used to cover the coil windings. But because of resin soaking during spinning, the windings become exposed necessitating stopping the spinner plate to top off the casings before the resin has set. After topping off, the casings are re-spun. Topping off is not entirely satisfactory because of the additional labor and time involved.

As an alternative and better technique to the topping off technique, the casings can be made deeper than required to contain sufficient resin before centrifuging to assure complete filling of all voids and interstices by centrifuging and without topping off. With the latter technique, any excess casing and resin are removed after the resin has set by being cut off. In addition to the considerable amount of added labor and resin material cost required in the "deep" casing technique, the coil must be designed without leads extending through the end which is cut off.

SUMMARY OF THE INVENTION

The present invention provides a unique centrifugal process and apparatus for impregnating and potting electrical components, such as ignition coils, which utilizes a rotating spinner assembly into which resin is poured and distributed into inward facing cavities of the components.

In one form, the present invention contemplates a centrifugal impregnator having a rotatable spinner assembly which is adapted to receive resin in a cavity. While the spinner assembly is rotating, the resin and any catalyst is added near the center of the cavity and flows by centrifugal force through distribution passages into electrical components, such as coil casings. Means are provided to mount the electrical components such that each component has the opening thereof through which resin is to pass facing inward toward an outlet of an associated distribution passage.

Adjacent resin distribution passages are preferably separated by a divider. The inner radial ends of the dividers terminate at points lying on a common circle having as its center the axis of rotation of the spinner assembly. The dividers diverge from this circle to define distribution passages which progressively narrow with increasing radius to their outlets. Narrowing is provided to facilitate the distribution of resin to the coil casings while preventing undesirable resin accumulation or pocketing on the walls of the spinner assembly. The avoidance of resin pocketing may be enhanced by forming the resin distribution passages such that they not only narrow radially outward by virtue of the dividers but narrow radially outward by the progressive reduction in height of the passages. In other words, the spinner assembly has distribution passages which direct the flow of resin to the casings without allowing resin buildup in pockets.

It is, of course, desirable to have the volume of resin flowing through the resin distribution passages equal in order that the impregnating and potting of all components is completed at the same time. To this end, the inner termini or ends of the dividers not only lie along a common circle but are equally spaced along this circle to define distribution passage entrances of equal cross section. The equal angular spacing of the inner termini of the dividers equalizes radial resin volume flow into the passages. The location of the inner ends of the dividers on a common circle serves to equally distribute angular flowing resin between the passages. Resin mist is an example of resin which experiences some angular flow because the drag between it and the resin on the floor of the resin cavity is insufficient to maintain essentially radial flow. The trailing divider wall serves to trap and direct resin experiencing angular flow into the distribution passages.

A resin distribution outlet or port is preferably at the outer radial terminus of each resin distribution passage. The outlet may be in the form of a distribution tube extending radially outward from its distribution passage.

This tube may be oriented such that resin emanating from it is directed into the cavity of an electrical component which is to receive resin without striking electrical component structure. For example, the distribution tube may be at a slight downward angle from the horizontal to clear the center post of a coil.

Each distribution tube provides a vehicle to facilitate the breaking away of resin at the tube's exit. Without the tubes extending beyond the wall of the spinner assembly, it is possible for resin to run down the wall of the spinner assembly proximate the resin outlet of each distributor passage. The function of the distribution tubes in providing a clean break of the resin from the exits of the distribution passages can be provided by an annular recess or lip surrounding the exit hole of each of the distribution passages. The provision of such recesses facilitates the breaking away of resin at the exits by presenting an alternate path requiring the resin to flow back towards the axis of rotation against centrifugal force.

In order to avoid troublesome air pumping through the distribution tubes which might cause resin to miss its targets, the tubes should have a relatively small diameter bore but not so small as to cause flow restriction.

The floor of the resin cavity should be substantially flat and run true in order to avoid high and low spots which produce uneven pickup of resin as the surface wobbles up and down against a downward flowing stream of resin. The effects of undulations produced when the floor of the resin cavity is not flat or does not run true produces, during resin pouring, an excessive amount of resin touching the floor in rising flow areas and too little touching the floor in falling areas. One way of overcoming any undulation problem is to provide a free running disc which is frictionally coupled to the spinner assembly such that it slows down relative to the spinner assemby in response to resin being poured onto it. The relative rotation between the spinner assembly and the disc averages out any flow irregularities caused by both of them.

The spinner assembly may have an annular channel with a plurality of mounting lugs disposed radially outward from the distribution ports. The channel provides a convenient means for securing electrical components during the impregnating and potting process while the mounting lugs provide a convenient means for registering the components with the distribution ports. The channel also provides a barrier against excessive air turbulence in the areas where resin enters the resin cavity. Nonetheless, the distribution tubes should be as close to the component cavities as possible. Closeness is necessary if the possible effects of turbulent air around the spinner are not to blow resin away.

In terms of process, the present invention envisions the use of the spinner assembly described above. Thermosetting resin is poured into the resin cavity while the spinner assembly is rotating and is forced by centrifugal force into the distribution passages and into the cavities of the electrical components being filled. In order to allow time for the thermosetting resin to fill the interstices and voids it must fill and to soak into coil windings, it is necessary to pour resin into the resin cavity relatively slowly so that the soaking or impregnating process can be complete when the last resin is added. Resin division is effected by the dividers and an equal flow rate through each passage is produced by the equally spaced inner divider termini and the constant radial distance of these divider termini.

The apparatus and method of the present invention provide an expeditious means for impregnating and potting electrical components such as ignition coils. The invention employs the known advantages of centrifugal impregnating and potting to fill the interstices present in many electrical components. By providing an apparatus and method wherein the thermosetting resin is poured into a resin receiving cavity while the spinner assembly is rotating, problems of filling each casing with resin are overcome. Moreover, it is not necessary to either top off or remove portions of the impregnated and potted component because filling is accomplished by centrifugal distribution during the impregnating and potting process. Therefore, resin soaking into the windings of a coil, for example, is readily compensated for by slowly pouring resin into the resin receiving cavity of the impregnator.

These and other features, aspects and advantages of the present invention will become more apparent with the following description, appended claims and drawings.

BRIEF DESCRIPTION OF THE FIGURES

FIG. 1 is a plan view, partly broken away and in section, of a preferred embodiment of the centrifugal impregnator of the present invention;

FIG. 2 is an elevational view, partly in half section and broken away, taken along lines 2—2 of FIG. 1; and FIG. 3 is a fragmentary, sectional view illustrating the potting or impregnation of an ignition coil according to the process and apparatus of the present invention.

DESCRIPTION OF THE PREFERRED EMBODIMENTS

Before describing the preferred embodiments of the present invention in detail, it is helpful to understand the nature of the problem resolved. For this purpose, FIG. 3 illustrates a typical ignition coil which may be impregnated by the process and apparatus of the present invention.

Basically, the coil illustrated in FIG. 3 comprises a casing 10 which may be made of plastic. A shell 12 is centrally disposed within the casing. The shell is of square cross section for receiving an iron core (not shown). An annulus about this shell receives a primary winding 14 and a secondary winding 16. These windings are, of course, spaced apart. A primary lead 18 extends through the base of the coil to a suitable terminal. A secondary lead 20 is attached to a high tension lead screw 22. High tension lead screw 22 is mounted in a partition of the casing which determines the bottom of a high tension lead recess 24. The threads of the screw are used to secure a high tension lead (not shown). The coil illustrated is filled with resin 26. If desired, leads can emanate from the exposed surface of resin 26.

This resin pots the coil by completely filling the interstice between the wires of the primary and secondary windings and also the gap between the two windings. The windings are impregnated by virtue of resin which has soaked into them. From the illustrated coil, it is evident that several spaces, voids or interstices must be filled with resin to assure the integrity of the coil.

With this brief description in mind, the process and apparatus of the invention will now be described.

With references to FIGS. 1 and 2, a centrifugal impregnator 25 is provided. The centrifugal impregnator includes a base 27, a motor drive 29 and a spinner assembly 31.

Drive 29 includes a motor 33 disposed within base 27. The motor is mounted to the base by way of an upright 35 which, in turn is secured to a floor 37 of the base. A drive shaft 39 extends upwardly from the motor through the base.

The spinner assembly includes a central body portion 41 which defines a resin receiving cavity 43. A plurality of resin distribution passages 45 open into resin receiving cavity 43. Resin distribution passages 45, in turn, meet a plurality of resin distribution ports or tubes 47. These ports open into a circumferential channel 49.

The inner diameter of the tubes is chosen to effect resin flow into the casings without restriction but not so large as to cause air pumping which might blow resin away from the cavity being filled. The exit of the distribution tubes is outwardly away from body portion 41 to cause the resin to break cleanly away from the tube instead of running down the outside of the body portion. Alternately, an annular recess or lip may be provided on the outside body portion around the distribution passage outlets to prevent resin from flowing down the wall of the outside of the body. The function of each, that is the tube and the recess or lip, is to present a flow path which dictates the immediate leaving of the resin from the resin exits by otherwise requiring resin flow against centifugal force.

A cover 51 may be provided for partially covering resin receiving cavity 43 and distribution passages 45.

The resin receiving cavity has a floor 53 which, within normal manufacturing tolerances, is flat. The floor is flat to assure even centrifugal distribution of resin into distribution passages 45. A hub 55 is provided in body portion 41 for receiving drive shaft 39. Drive shaft 39 is coupled to spinner assembly 31 as through splines or a key.

Each resin distribution passage has a progressively norrowing cross section as the radial distance from the spin axis of spinner assembly 31 increases. The inner end of each distribution passage lies on an imaginary circle defined by knife edges 57 of dividers 59. While the illustrated inner ends of dividers 59 are sharp, they need not be, so long as they effect their division function. The walls of dividers 59 which define the distribution passages are generally V-shaped in plan. In elevation, the resin distribution passages also narrow radially outward. This narrowing is accomplished by a sloping roof 61 for each passage and a slightly curved wall 63 at the passage's outer radial end.

This distribution passage configuration provides for resin flow into distribution tubes 47 without trapping resin in the passage or promoting resin buildup. In short, passages 45 have no pockets for resin accumulation.

The inner knife edges 57 of dividers 59 lie on a common circle whose center is the center of rotation of the spinner assembly. The knife edges also are equally spaced around the circle to define distribution passage entrances of equal area. The uniformity of angular spacing of edges 57, therefore, secures equal radial resin flow into the passages by defining passage entrances of equal area. As a practical matter, some resin mist may be formed above the body of resin in cavity 43 which is susceptible to angular flow because the drag on it by the rest of the resin is not sufficient to keep its flow direction essentially radial. The uniformity in radial spacing of edges 57 ensures that any angular flow of resin does not produce unequal flow rates between distribution passages because at a given radius angular flow rate components around the circle defined by the given radius are equal.

In sum, the equal spacing of the leading inner edges of dividers 59, both radially and angularly, produces equal resin flow in each passage by the trailing divider wall at the entrance of each passage trapping and directing an equal amount of angular flowing resin while radially flowing resin is presented with passage entrances of equal area normal to the direction of radial flow.

Distribution ports 47 open at the outer radial limits of distribution passages 45. The ports illustrated are in the form of tubes oriented at a slight downward angle from the horizontal. The tubes are received in bores in central body portion 41 and extend outward from a vertical circumferential wall 63 bounding the inner end of channel 49. The angle of the tubes is provided to distribute resin within the annular cavity outside of shell 12 of casing 10. It is, of course, possible to have the distribution tubes oriented horizontal when no barrier is presented by the component to be impregnated.

Annular channel 49 is defined by inner wall 63, an outer circumferential wall 65, and a horizontal, circumferential floor 66 between the walls. A plurality of equally spaced mounting lugs 67 are provided in the outer wall. For this purpose, a mounting boss 69 is provided for each of the mounting lugs. The inner vertical shoulders of the mounting bosses provide stops to position the casings to be impregnated. Mounting lub 67 is foreshortened in order to provide for the easy removal and installation of casings. Each of the lugs 67 is disposed radially outward of one of the ports 47. The channel also provides a space where air is more or less trapped and travels at roughly the same rotational speed as the spinner assembly. The presence of this "quiet" air prevents excessive blowing of resin away from the component cavities being filled. However, a close proximity of the distribution tube exits with the component cavities entrances is also helpful to prevent errant resin flow.

In order to overcome the effects of runout or waviness present in floor 53 of resin receiving cavity 43 on even resin distribution into resin distribution passages 45, a free disc 70 may be provided. This disc is mounted on shaft 39 through a bearing 72. Because of bearing friction, disc 70 comes up to the speed of shaft 39 before resin is added. When resin is poured onto the disc, the disc slows down relative to the balance of the spinner assembly. Even if the disc does not run true or is not essentially flat, resulting in resin being thrown from the disc unevenly, the relative rotation between the distribution passages and the disc will average out flow irregularities owing to the large number of revolutions in a given potting and impregnating process. The result is even resin distribution to all component cavities. With the disc, the resin cavity floor need not be used for distributing resin, but if it is, any irregularities in the floor surface are compensated for by the relative rotational speed differential between the floor and the disc.

In terms of process, the coil casings previously described are fabricated in a known manner, with the exception of the impregnating resin.

The coil casings are normally baked for a period of time in order to remove moisture. The dry casings are mounted in channel 49 on lugs 67 with the ends of their casings facing the exits of the distribution tubes. The resin and catalyst are heated to a temperature at which they are relatively free flowing, say 120° F. for some common thermosetting resins. The temperature, again, is within the province of those skilled in the art.

After the spinner assembly is started and is rotating at, say, 1400 r.p.m., the resin and a catalyst are each poured into resin receiving cavity 43 where they mix and are forced into distribution passages 45, out through distribution tubes 47 and into the cavities of the components being potted and impregnated. The resin and catalyst are mixed by a combination of the factors of centrifugal action and the rotational velocity differential between the floor of the spinner assembly and the sources of the pouring resin and catalyst.

With a radius of about 10 inches between the axis of rotation of the spinner assembly and the casings to be filled, the resin will be distributed into the coil casings under a load of the order of 600 $g$'s. At this loading, the resin will soak into the primary and secondary windings in less than half a minute. In order to provide for this soak time and to completely fill the desired cavity, the resin and catalyst are poured slowly into the resin receiving cavity over the entire soak period and for sufficient time thereafter to completely cover the coil winding. For an impregnating apparatus of this size and speed, a distribution tube inner diameter of about 0.25 inch will prevent undesirable air pumping. In addition, with one-half minute fill time, each coil casing will pass the point where the resin is poured over 700 times. This results in a good distribution of resin into each casing. When free disc 70 is used, the same procedure obtains except that the resin and catalyst are poured onto the disc where they mix and are thrown outward into distribution passages 45 for even direction through tubes 47 into the coil casings. Again, the difference in rotation speed between the disc and the spinner assembly evens out the effects of surface unevenness and out-of-true running.

With the operating parameters noted above, the final potted and impregnated coils will be completely filled with resin without any significant incidence of voids. The surface of the resin will be conical owing to the effects of the centrifugal force and gravity with a cone angle of about 1¼°. However, the presence of this angle does not affect the final product. Alternately, each coil casing can be cocked up by this amount to improve level filling.

What is claimed is:

1. A process for impregnating and potting electrical components and the like with resin comprising:
   (a) mounting a plurality of components at a distance from the spin axis of a spinner assembly with the cavities of such components to be filled with resin facing inwardly toward the spin axis;
   (b) rotating the spinner assembly;
   (c) rotating a free disc disposed in a resin receiving cavity of the spinner assembly at an angular velocity differential with respect to the spinner assembly;
   (d) pouring a resin into the resin receiving cavity of the spinner assembly onto the rotating free disc;
   (e) distributing resin by centrifugal force into plurality of resin distribution passages of the spinner assembly, the centrifugal force being imparted to the resin at least in part by the rotating free disc; and
   (f) forcing the resin in the resin distribution passages into the cavities in the electrical components by centrifugal force.

2. The process claimed in claim 1 wherein the resin is poured into the resin receiving cavity over a time period at least corresponding to the time required for the resin to saturate the winding of the electrical components.

3. The process claimed in claim 1 wherein the resin is divided into the resin distribution passages by a plurality of divided walls disposed in equally spaced relationship circumferentially about the spin axis, the components being mounted circumferentially about the spin axis.

4. The process claimed in claim 3 including the additional steps of:
   (a) pouring catalyst into the resin receiving cavity simultaneously with the pouring of the resin; and
   (b) mixing the catalyst with the resin by the centrifugal action of the spinner assembly and the difference in rotational velocity of the spinner assembly with respect to the sources of the pouring catalyst and resin.

5. The process claimed in claim 1 wherein:
   (a) rotation of the free disc is effected by a friction coupling between the free disc and the spinner assembly; and
   (b) the angular velocity differential is effected by the pouring of the resin onto the rotating free disc from a resin source which is stationary relative to the free disc.

6. The process claimed in claim 5 wherein:
   (a) a catalyst is poured onto the rotating disc from a source which is stationary relative to the free disc; and
   (b) the catalyst and the resin are mixed by a combination of the centrifugal action produced by the free disc and the difference in rotational velocity of the free disc and the sources of resin and catalyst.

7. The process claimed in claim 6 wherein the resin is equally divided between the resin passages by a plurality of divider walls disposed in equally spaced relationship circumferentially about the spin axis, the components being mounted circumferentially about the spin axis.

References Cited

UNITED STATES PATENTS

| 3,017,854 | 1/1962 | O'Brien | 118—52 |
| 3,352,280 | 11/1967 | Hughes et al | 118—319 |

FOREIGN PATENTS

| 742,413 | 12/1955 | Great Britain | 264—272 |

ROBERT F. WHITE, Primary Examiner

T. E. BALHOFF, Assistant Examiner

U.S. Cl. X.R.

264—297, 311